United States Patent [19]

Okawa

[11] Patent Number: 5,486,635
[45] Date of Patent: Jan. 23, 1996

[54] METHOD FOR PREPARING DIORGANOPOLYSILOXANE HAVING A FUNCTIONAL GROUP AT ONLY ONE END OF THE MOLECULAR CHAIN

[75] Inventor: Tadashi Okawa, Chiba, Japan

[73] Assignee: Dow Corning Toray Silicone Co., Ltd., Tokyo, Japan

[21] Appl. No.: 428,938

[22] Filed: Apr. 25, 1995

[30] Foreign Application Priority Data

Apr. 28, 1994 [JP] Japan .................................. 6-113951

[51] Int. Cl.$^6$ .................................................. C07F 7/08
[52] U.S. Cl. ........................ 556/437; 556/440; 556/442; 556/451; 556/453; 556/456
[58] Field of Search ............................. 556/442, 453, 556/440, 437, 456, 457

[56] References Cited

U.S. PATENT DOCUMENTS

| | | | |
|---|---|---|---|
| 4,876,373 | 10/1989 | Okawa et al. | 556/453 |
| 5,045,621 | 9/1991 | Suzuki | 556/453 |
| 5,256,754 | 10/1993 | Takarada et al. | 556/440 X |
| 5,272,243 | 12/1993 | Nakashima et al. | 556/451 X |

FOREIGN PATENT DOCUMENTS

| | | |
|---|---|---|
| 59-78236 | 5/1984 | Japan . |
| 01131247 | 5/1989 | Japan . |

*Primary Examiner*—Paul F. Shaver
*Attorney, Agent, or Firm*—Alexander Weitz

[57] ABSTRACT

There is disclosed a method for preparing a diorganopolysiloxane having a functional group at only one end of the molecular chain and having the formula $$R(R_2SiO)_pB$$

wherein R is an independently selected monovalent hydrocarbon group, B is selected from the group consisting of a hydrogen atom and an organosilyl group having the formula $$-SiR_2R'$$

in which R is as defined above, R' is selected from the group consisting of a hydrogen atom and an organic functional group and p is an integer having a value of at least 1, said method comprising:

(I) polymerizing
  (A) a cyclic trisiloxane, using
  (C) a lithium compound catalyst, said polymerization reaction taking place in the presence of
  (D) a compound selected from the group consisting of a nitrile compound and an ester compound and
  (E) a polar solvent which does not contain activated hydrogen; and
(II) terminating the nonequilibrium polymerization reaction product obtained from step (I) using
  (F) a compound selected from the group consisting of an acid and an organohalogenosilane.

12 Claims, No Drawings

METHOD FOR PREPARING DIORGANOPOLYSILOXANE HAVING A FUNCTIONAL GROUP AT ONLY ONE END OF THE MOLECULAR CHAIN

FIELD OF THE INVENTION

The present invention relates to a manufacturing method of diorganopolysiloxane having a functional group at only one end of the molecular chain. Specifically, the invention relates to a manufacturing method of diorganopolysiloxane having a functional group at only one end of the molecular chain of high purity.

BACKGROUND OF THE INVENTION

A diorganopolysiloxane which has a functional group at only one end of the molecular chain can be copolymerized with organic monomer by utilizing the reactivity of the functional group. The siloxane is a useful modifier of the organic resins since it can impart characteristics of organopolysiloxane, such as weather resistance, surface water repellent characteristics, lubricity and as permeability to the organic resin.

A manufacturing method for the preparation of such a diorganopolysiloxane having a functional group at only one end of the molecular chain has been proposed wherein cyclic trisiloxane is subjected to a nonequilibrium polymerization reaction with alkyl lithium, or lithiumsilanolate, as the polymerization initiator, either in the presence or absence of organosilane or organosiloxane which is capped at one end with hydroxyl group and acts as a molecular weight regulator. This nonequilibrium polymerization reaction is terminated by the addition of acid or organo functional group-containing organochlorosilane (refer to JP (Kokai) 59.78236, JP (Kokai) 1-131247, JP (Kokai) 2-92933). However, when the diorganopolysiloxane having a functional group at only one end of the molecular chain obtained by this manufacturing method is copolymerized with organic monomer, there have been such problems as the drastic increase of viscosity during the reaction. In particular, even gelation can occur when the diorganopolysiloxane has molecular weight greater than 10,000. Furthermore, unreacted organopolysiloxane remains after the reaction. In order to study the cause of these problems, the present inventor analyzed such diorganopolysiloxanes having a functional group at only one end of the molecular chain by gel permeation chromatography. It was confirmed that, in addition to the primary peak attributable to such diorganopolysiloxane having a functional group at only one end of the molecular chain, a secondary peak was observed on the higher molecular weight side of the primary peak. Further, the proportion of this secondary peak increased with increasing molecular weight of the diorganopolysiloxane having a functional group at only one end of the molecular chain. It was concluded from these results that the diorganopolysiloxane obtained by the manufacturing method described above contains diorganopolysiloxane having functional groups at both ends and diorganopolysiloxane having functional group at neither end as impurities. Consequently, a manufacturing method for preparing diorganopolysiloxane having a functional group at only one end of the molecular chain of high purity, without forming these by-products, is needed.

The present inventor previously proposed a manufacturing method of diorganopolysiloxane having a functional group at only one end of the molecular chain wherein the nonequilibrium reaction is carried out after a small amount of silanol group-containing impurities existing in the cyclic trisiloxane, used as the raw material of polymerization, are silylated in advance. This method has been effective to inhibit the secondary production of diorganopolysiloxane having functional groups at both ends caused by the silanol group-containing impurities in the cyclic trisiloxane. However, it has not been possible by this method to completely inhibit the secondary production of diorganopolysiloxane having functional group at neither end or diorganopolysiloxane having functional groups at both ends caused by the dimerization or equilibration reaction of α-hydroxydiorganopolysiloxane, which occurs as the side reaction during the polymerization of cyclic trisiloxane.

SUMMARY OF THE INVENTION

The present inventor has discovered that, when the conventional nonequilibrium polymerization reaction is carried out in the presence of a nitrile compound or an ester compound and also a polar solvent which does not contain activated hydrogen, the ratio of side reaction described above is extremely small. The objective of the present invention is to present a manufacturing method for preparing diorganopolysiloxane having a functional group at only one end of the molecular chain in high purity and in high yield.

The present invention therefore relates to a manufacturing method for preparing a diorganopolysiloxane having a functional group at only one end of the molecular chain and having the general formula: $R(R_2SiO)_pB$ wherein R is an identical or different monovalent hydrocarbon group, B is a hydrogen atom or organosilyl group of the formula —$SiR_2R'$ in which R is an identical or different monovalent hydrocarbon group, and R' is a hydrogen atom or an organic functional group, and p is an integer having a value of at least 1. The method comprises (I) polymerizing (A) cyclic trisiloxane of the general formula

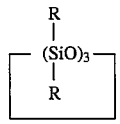

wherein R is an identical or different monovalent hydrocarbon group, optionally in the presence of (B) an organosilane or organosiloxane shown by the general formula $R(R_2SiO)_mH$ in which R is an identical or different monovalent hydrocarbon group, and m is an integer of at least 1, using (C) a lithium compound catalyst of the formula $R(R_2SiO)_nLi$, in which R is an identical or different monovalent hydrocarbon group, and n is an integer of at least 0, and subsequently (II) terminating the above non-equlibrium polymerzation reaction using (D) an acid or an organohalogenosilane of the formula $R'R_2SiX$, in which R is an identical or different monovalent hydrocarbon group, R' is a hydrogen atom or an organic functional group, and X is a halogen atom, wherein the above non-equilibrium polymerization reaction (I) is carried out in the presence of (E) a nitrile compound or ester compound and (F) a polar solvent which does not contain activated hydrogen.

The present invention has been disclosed in Japanese Laid Open Patent Application Number Hei 06-113951(94) the full disclosure of which is hereby incorporated by reference.

DETAILED DESCRIPTION OF THE INVENTION

The (A) constituent used in the present invention, cyclic trisiloxane, is the one known as the monomer for nonequilibrium polymerization reaction. In the above formula for this cyclic siloxane, R is an identical or different monovalent hydrocarbon group. Specifically, R can be an alkyl group such as methyl group, ethyl group, propyl group, butyl group, pentyl group, or hexyl group; an alkenyl group such as vinyl group, allyl group, or hexenyl group; or an aralkyl group such as benzyl group or phenethyl group. R is preferably a methyl group or vinyl group for ease of manufacture. The cyclic trisiloxane is exemplified by 1,1,3,3,5,5-hexamethylcyclotrisiloxane, 1,1,3,3,5,5-hexaphenylcyclotrisiloxane, 1,1,3,3,5,5-hexavinylcyclotrisiloxane, 1,3,5-trimethyl-1,3,5-trivinylcyclotrisiloxane, 1,3,5-trimethyl-1,3,5triphenylcyclotrisiloxane, 1,3,5-triethyl-1,3,5-trimethylcyclotrisiloxane, 1,3,5-trimethyl-1,3,5-tripropylcyclotrisiloxane, and 1,3,5-trimethyl-1,3,5-triphenethylcyclosiloxane. The above cyclic trisiloxane usually contains as impurities small amounts of silane or siloxane which contains at least 2 silanol groups. It is therefore preferable to silylate these silanol groups with a silylation agent before carrying out the nonequilibrium polymerization reaction, as was proposed by the present inventor in JP (Application) 5-151052. The silylation agent can be a silylation agent which contains halogen atoms bonded to silicon atoms. Examples include chlorosilanes such as trimethylchlorosilane, dimethyldichlorosilane, phenyldimethylchlorosilane, and t-butyldimethylchlorosilane; bromosilanes such as trimethylbromosilane, and triethylbromosilane. The silylation agent can also contain nitrogen atoms bonded to silicon atoms. Examples of this type include silazanes such as hexamethyldisilazane; and silylamines such as dimethylaminotrimethylsilane, diethylaminotrimethylsilane, and trimethylsilylimidazole; and silylamides such as bis (trimethylsilyl) acetoamide; trimethylsilyldiphenylurea, and bis (trimethylsilyl) urea.

The (B) constituent used in the present invention (i.e., organosilane or organosiloxane) is used as needed to adjust the molecular weight of the diorganopolysiloxane having a functional group at only one end of the molecular chain. Component (B) has the general formula $R(R_2SiO)_mH$, wherein R has its previous definition, and m is an integer having the value of at least 1, and preferably a value of 1–20. Examples of the organosilane include trimethylsilanol, dimethylvinylsilanol, dimethylphenylsilanol, and triphenylsilanol. Examples of the above organosiloxane include dimethylsiloxane capped with hydroxydimethylsiloxy group at one end and with trimethylsiloxy group at the other end, methylphenylsiloxane capped with hydroxydimethylsiloxy group at one end and with trimethylsiloxy group at the other end, methylphenylsiloxane capped with hydroxydiphenylsiloxy group at one end and with trimethylsiloxy group at the other end, methylphenylsiloxane capped with hydroxydimethylsiloxy group at one end and with dimethylvinylsiloxy group at the other end, methylphenylsiloxane-methylvinylsiloxane copolymer capped with hydroxydimethylsiloxy group at one end and with trimethylsiloxy group at the other end, and methylphenylsiloxane-diphenylsiloxane copolymer capped with hydroxydimethylsiloxy group at one end and with trimethylsiloxy group at the other end. These organosilanes or organosiloxanes can be manufactured, for example, by careful hydrolysis of organomonochlorosilanes, or diorganopolysiloxanes which have halogen atom bonded to silicon atom only at one end of the molecular chain, the hydrolysis taking place in a basic dilute aqueous solution.

The lithium compound (C) acts as catalyst for the nonequilibrium polymerization reaction of the (A) constituent or of the (A) constituent and the (B) constituent. This catalyst has the general formula $R(R_2SiO)_nLi$, wherein R is an identical or different monovalent hydrocarbon group as defined above. In this formula, n is an integer having a value of at least 0. When n is 1 or greater, it is preferred to have a value of 1–20 for the ease of manufacture. When n is 0, this constituent is an organic lithium compound which is available commercially, and can be easily obtained. On the other hand, when n is an integer 1 or greater, this constituent is lithium silanolate or lithium siloxanolate. The manufacturing methods of these lithium silanolates or lithium siloxanolates are known. For example, they can be obtained by reacting a silanol group-containing organosilane or organosiloxane, such as the (B) constituent, with a lithium compound and forming their respective lithium derivatives. Also, the lithium compound catalyst containing unreacted silanol group-containing organosilane or organosiloxane, obtained by reacting less moles of lithium compound than moles of the silanol groups, can be used as the mixture of the (B) constituent and the (C) constituent. The lithium compound catalyst (C) can be an alkyl lithium such as n-butyl lithium, s-butyl lithium, t-butyl lithium, and methyl lithium; an aryl lithium such as phenyl lithium and xylyl lithium; an alkenyl lithium such as vinyl lithium and allyl lithium; or a lithium salt of an organosilane or an organosiloxane such as lithium trimethylsilanolate, lithium dimethylvinylsilanolate, and lithium triphenylsilanolate. The lithium compound used to prepare lithium silanolate or lithium siloxanolate can also be a lithium amide such as lithiumbis(diisopropyl)amide.

The lithium compound catalyst (C) is used in sufficient amount to cause the ring opening reaction of the cyclic trisiloxane (A). This catalyst is added in such an amount that its molar ratio to the (B) constituent is 100/0 to 0.01/100. Also, for the case when the silylation agent is used for silylation of the silanol group-containing impurity in the (A) constituent, the addition should be preferably in such an amount that the molar ratio of the lithium compound catalyst remaining after the silylation to the (B) constituent is 100/0 to 0.01/100. Furthermore, if this ratio is 0.5/99.5 to 50/50, an appropriate reaction rate of the nonequilibrium polymerization reaction can be obtained, the manufacturing efficiency is improved, and the expensive lithium compound catalyst can be saved.

The (D) constituent used in the present invention, acid or organohalogenosilane, is the constituent used to terminate the nonequilibrium polymerization reaction described above, and it forms a stable lithium salt by reaction with lithium silanolate. The acid can be a mineral acid such as wet carbonic acid gas, hydrochloric acid or sulfuric acid; or a caroxylic acid such as acetic acid, propionic acid, or acrylic acid. The organohalogenosilane (D) has the general formula $R'R_2SiX$ wherein R is an identical or different monovalent hydrocarbon group, as defined above. R' is a hydrogen atom or organic functional group. Specifically, R' can be an alkenyl group such as vinyl group, allyl group, butenyl group, pentenyl group, hexenyl group, and heptenyl group; a 3-methacryloxypropyl group, a 3-acryloxypropyl group, or a 3-chloropropyl group, In the above formula, X is a halogen atom. Examples of organohalogenosilane (D) include dimethylchlorosilane, dimethylvinylchlorosilane, 3-methacryloxypropyldimethylchlorosilane, or 3-chloropropyldimethylchlorosilane.

When acid such as wet carbonic acid gas, mineral acid or carboxylic acid is used as constituent (D) to terminate the above nonequilibrium polymerization reaction, a a diorganopolysiloxane having a silanol group at only one end of the molecular chain is obtained. When an organo functional group-containing organohalogenosilane is used as constituent (D) to terminate the above nonequilibrium polymerization reaction, a diorganopolysiloxane having one end capped with silyl residue (i.e., the remainder of the organo functional group-containing organohalogenosilane from which halogen atoms are removed), is obtained. When halogenosilane, containing hydrogen atom bonded to silicon atom, such as dimethylchlorosilane, is used as constituent (D) to terminate the above nonequilibrium polymerization reaction, a diorganopolysiloxane having one end capped with hydrogen atom bonded to silicon atom is obtained. Further, by addition reaction of this diorganopolysiloxane having hydrogen atom bonded to silicon atom at one end, and an organo functional group-containing alkenyl compound such as allylglycidylether, allylamine, allyl alcohol, trimethylolpropanemonoallylether, glycerolmonoallylether, allylmethacrylate, and the like, in the presence of hydrosilation reaction catalyst such as platinum base catalyst, it is possible to manufacture a diorganopolysiloxane having one end capped with organo functional group bonded to silicon atom. In this process, the organo functional group can be protected by a protecting group such as trimethylsilyl group, as needed. After the addition reaction is completed, this protecting group can be detached. Also, by dehydrohalogenation reaction by adding the organic functional group-containing organohalogenosilane of constituent (D) to the diorganopolysiloxane having a silanol group at only one end of the molecular chain obtained by using acid as constituent (D), it is possible to manufacture a diorganopolysiloxane having one end capped with an organo functional group bonded to silicon atom. In this case, a hydrogen halide scavenger such as an organic amine compound or ammonia is preferrably added.

The (E) constituent used in the present invention, nitrile compound or ester compound, functions to inhibit the formation of by-products during the nonequilibrium polymerization reaction. The nitrile compound and the ester compound, respectively, can be used individually as constituent (E). A mixture of the nitrile compound and the ester compound can also be used. The nitrile compound can be acetonitrile, propionitrile, succinonitrile, butyronitrile, isobutyronitrile, valeronitrile, and α-tolunitrile, and a mixture of two or more of these can be used as well. Among these, acetonitrile is the most preferable considering the ease of removal after the end of the nonequilibrium polymerization reaction and its economy and toxicity. The ester compound can be acetic acid esters such as methyl acetate, ethyl acetate, propyl acetate, isopropyl acetate, butyl acetate, isobutyl acetate, sec-butyl acetate, pentyl acetate, isopentyl acetate, cyclohexyl acetate, and benzyl acetate; propionic acid esters such as methyl propionate, ethyl propionate, butyl propionate, and isopentyl propionate; or the mixtures of two or more of these. Of the Ester compounds, acetic acid ester is preferred, methyl acetate and ethyl acetate being most preferable considering the ease of removal after the end of the nonequilibrium polymerization reaction, and the economy. Use of nitrile compound described above is preferred for component (E).

The (F) constituent, polar solvent not containing activated hydrogen, is used to promote the nonequilibrium polymerization. This solvent can be tetrahydrofuran, 1,4-dioxane, ethyleneglycoldimethylether, diethyleneglycoldimethylether, dimethylformamide, dimethyl sulfoxide, or hexamethylphosphoric triamide, or a mixture of two or more of these. Among these, tetrahydrofuran, dimethylformamide, and dimethyl sulfoxide are preferred considering their ability to promote the nonequilibrium polymerization, the ease of removal after the end of the nonequilibrium polymerization reaction, and the economy. Since the ability to promote the nonequilibrium polymerization varies as a function of the type of constituent (F) used, the amount to be added is generally determined by routine experimentation. For example, when 1,1,3,3,5,5-hexamethylcyclotrisiloxane is used as the (A) constituent, and constituent (F) is tetrahydrofuran, its amount is preferably 50 to 200% relative to the siloxane; if (F) is dimethyl sulfoxide, its amount is preferably 0.5 to 5 %; and if (F) is dimethylformamide, its amount is preferably 1 to 10again relative to the siloxane.

In the manufacturing method of the present invention, the reaction temperature and the reaction time of the nonequilibrium polymerization reaction are not particularly limited, but is necessary to adjust them carefully enough not to cause equilibrium polymerization (i.e., redistribution reaction). Thus, if the equilibrium polymerization occurs diorganopolysiloxane, capped with lithium silanolate groups or silanol groups at both ends as well as diorganopolysiloxane, in which neither end is capped with lithium silanolate group or silanol group, are formed as by-products. When 1,1,3,3,5, 5-hexamethylcyclotrisiloxane is used as the (A) constituent, a preferable condition for this nonequilibrium polymerization reaction is at the temperature of 0 to 40° C. for 1 to 50 hours.

The progress of the non-equilibration polymerization reaction in the preparation method according to the present invention can be followed by monitoring the decrease in component (A) by an analytical means such as gas chromatography and the like. This non-equilibration polymerization reaction is preferably stopped by the addition of component (D) when the component (A) conversion has reached a desired value. While the component (A) conversion must be adjusted to the nature of component (A) and the nature of the monoterminal-functional diorganopolysiloxane product, this conversion will generally be 50 to 100% and preferably 70 to 90%

Also, although the nonequilibrium polymerization reaction can be carried out without using any solvent other than the (E) constituent and the (F) constituent, it is preferable to add an aprotic solvent in order to carry out the nonequilibrium polymerization reaction in a homogeneous condition. The aprotic solvent, which can be used, may be an aromatic solvent such as toluene and xylene; or an aliphatic solvent such as hexane, heptane, and cyclohexane. Prior to the nonequilibrium polymerization reaction described above, it is necessary to remove moisture from each constituent and each solvent as much as possible. If moisture exists in a constituent or solvent, organopolysiloxane which is capped with lithium silanolate groups or silanol groups at both ends is formed as by-product.

The diorganopolysiloxane having a functional group at only one end of the molecular chain manufactured by the method of the present invention has the general formula $R(R_2SiO)_pB$. In this formula, R is an identical or different monovalent hydrocarbon group, as defined above. B is a hydrogen atom or an organosilyl group of the formula —$SiR_2R'$, wherein R is the same as described above, and R' is a hydrogen atom or an organo functional group, as defined above and p is an integer having a value of at least 1. The molecular weight of this diorganopolysiloxane is determined by the ratio of the (B) constituent and the (C) constituent existing in the system during the nonequilibrium polymerization reaction relative to the (A) constituent consumed.

Since the content of impurities such as diorganopolysiloxane having functional groups at both ends or diorganopolysiloxane having functional group at neither end is extremely low in the diorganopolysiloxane having a functional group at only one end of the molecular chain obtained by the manufacturing method of the present invention, even if this diorganopolysiloxane is subjected to a copolymerization reaction with an organic monomer, there is no drastic increase in viscosity during the reaction, let alone gelation. Consequently, it is useful as a modifier for various organic polymers, for example, as a modifier to add lubricity, weather resistance, moisture proof, gas permeability, inter alia.

EXAMPLES

In the following, the present invention is explained in detail by Examples. The number average molecular weight and polydispersity of the organopolysiloxane having a functional group at only one end of the molecular chain are calibrated values based on standard polystyrene gel permeation chromatography. Also, trimethylsilanol, dimethylformamide, acetonitrile, and ethyl acetate used in the Examples were dried in advance.

Example 1

1,1,3,3,5,5-hexamethylcyclotrisiloxane (100 grams; 449.5 millimoles) and toluene (75 grams) were mixed and subjected to azeotropic dehydration for 1 hour. After dehydration, the solution was cooled to room temperature, and 1.63 N hexane solution of n-butyl lithium (2.0 milliliters; n-butyl lithium=3.26 millimoles) was added and stirred for 10 minutes at room temperature. Subsequently, trimethylchlorosilane (0.336 gram; 3.1 millimoles) was added and stirred for 5 minutes at room temperature. A mixture of trimethylsilanol (0.741 gram; 8.23 millimoles), dimethylformamide (8.0 grams) and acetonitrile (25.0 grams) was then added and a white precipitate formed as the nonequilibrium polymerization reaction started. After the start of the reaction, at the passage of fixed times (5.5 hours, 8 hours, 22.17 hours), the reaction mixture was sampled and its nonequilibrium polymerization reaction was terminated by adding a drop of acetic acid, and dimethylpolysiloxane having a functional group at only one end of the molecular chain was obtained. From the dimethylpolysiloxane having a functional group at only one end of the molecular chain obtained, the conversion of 1,1,3,3,5,5-hexamethylcyclotrisiloxane was tracked by gas chromatography (hereafter GLC). Also, the number average molecular weight and the polydispersity of the silanol group-functional dimethylpolysiloxane obtained were tracked by gel permeation chromatography (hereafter GPC). These results are shown in Table 1.

Also, to the reaction mixture after 5.5 hours from the start of the reaction, diethylamine and methacryloxypropyldimethylchlorosilane were added in order, and heated and stirred at 60° C. for 2 hours. The by-product salts were then filtered out, and low boiling point substance was distilled off by heating under reduced pressure. After cooling, the precipitated salts were further filtered out and dimethylpolysiloxane having a methacryloxy group at only one end of the molecular chain was obtained. According to analysis by GPC of this dimethylpolysiloxane having a methacryloxy group at only one end of the molecular chain, its number average molecular weight was 10,723 and the polydispersity was 1.04.

TABLE 1

| Reaction time (hrs) | 5.5 | 8 | 22.17 |
|---|---|---|---|
| Conversion of 1,1,3,3,5,5-hexamethylcyclotrisiloxane (%) Dimethylpolysiloxane having a silanol group at only one end of the molecular chain | 79.8 | 88.6 | 99.6 |
| Number average molecular weight (Mn) | 10525 | 11770 | 13210 |
| Polydispersity = Mw/mn | 1.04 | 1.04 | 1.08 |

Comparison Example 1

Nonequilibrium polymerization reaction was carried out in the same way as Example 1 except that the amount of addition of dimethylformamide was 4.0 grams and acetonitrile was not added. After various times (6.17 hours, 8 hours, 22 hours), the reaction mixture was sampled, and in the same way as Example 1, dimethylpolysiloxane having a silanol group at only one end of the molecular chain was obtained. From the dimethylpolysiloxane having a silanol group at only one end of the molecular chain obtained, the conversion of 1,1,3,3,5,5-hexamethylcyclotrisiloxane was tracked by GLC. Also, the number average molecular weight and the polydispersity of the dimethylpolysiloxane having a silanol group at only one end of the molecular chain obtained were tracked by GPC. These results are shown in Table 2.

Also, to the reaction mixture after 6.17 hours from the start of the reaction, diethylamine and methacryloxypropyldimethylchlorosilane were added in order and, in the same way as Example 1, dimethylpolysiloxane having a methacryloxy group at only one end of the molecular chain was obtained. According to the analysis by GPC of the dimethylpolysiloxane having a methacryloxy group at only one end of the molecular chain obtained, its number average molecular weight was 11,952 and the polydispersity was 1.06.

TABLE 2

| Reaction time (hrs) | 6.17 | 8 | 22 |
|---|---|---|---|
| Conversion of 1,1,3,3,5,5-hexamethylcyclotrisiloxane (%) Dimethylpolysiloxane having a silanol group at only one end of the molecular chain | 80.5 | 86.9 | 99.7 |
| Number average molecular weight (Mn) | 11243 | 12328 | 13819 |
| Polydispersity = Mw/Mn | 1.05 | 1.05 | 1.13 |

Example 2

Nonequilibrium polymerization reaction was carried out in the same way as Example 1 except that dimethyl sulfoxide (2.0 grams) was used instead of the dimethylformamide in Example 1. After various times (3.83 hours, 5.33 hours, 22 hours), the reaction mixture was sampled, and in the same way as Example 1, dimethylpolysiloxane having a silanol group at only one end of the molecular chain was obtained. From the dimethylpolysiloxane having a silanol group at only one end of the molecular chain obtained, the conversion of 1,1,3,3,5,5-hexamethylcyclotrisiloxane was tracked by GLC. Also, the number average molecular weight and the polydispersity of the dimethylpolysiloxane having a silanol group at only one end of the molecular chain obtained were tracked by GPC. These results are shown in Table 3.

TABLE 3

| Reaction time (hrs) | 3.83 | 5.33 | 22 |
|---|---|---|---|
| Conversion of 1,1,3,3,5,5-hexamethylcyclotrisiloxane (%) | 80.6 | 90.4 | 100 |
| Dimethylpolysiloxane having a silanol group at only one end of the molecular chain | | | |
| Number average molecular weight | 9953 | 11133 | 12883 |
| Polydispersity | 1.05 | 1.05 | 1.10 |

Comparison Example 2

Nonequilibrium polymerization reaction was carried out in the same way as Example 2 except that acetonitrile was not used. After various times (3.25 hours, 4.5 hours, 22 hours), the reaction mixture was sampled, and in the same way as Example 2, dimethylpolysiloxane having a silanol group at only one end of the molecular chain was obtained. From the dimethylpolysiloxane having a silanol group at only one end of the molecular chain obtained, the conversion of 1,1,3,3,5,5-hexamethylcyclotrisiloxane was tracked by GLC. Also, the number average molecular weight and the polydispersity of the dimethylpolysiloxane having a silanol group at only one end of the molecular chain obtained were tracked by GPC. These results are shown in Table 4.

TABLE 4

| Reaction time (hrs) | 3.25 | 4.5 | 22 |
|---|---|---|---|
| Conversion of 1,1,3,3,5,5-hexamethylcyclotrisiloxane (%) | 80.5 | 90.1 | 100 |
| Dimethylpolysiloxane having a silanol group at only one end of the molecular chain | | | |
| Number average molecular weight | 11037 | 11525 | 11077 |
| Polydispersity | 1.06 | 1.08 | 1.59 |

Example 3

Nonequilibrium polymerization reaction was carried out in the same way as Example 1 except that ethyl acetate (25 grams) was used instead of the acetonitrile in Example 1. After various times (3.08 hours, 4.32 hours, 22 hours), the reaction mixture was sampled, and in the same way as Example 1, dimethylpolysiloxane having a silanol group at only one end of the molecular chain was obtained. From the dimethylpolysiloxane having a silanol group at only one end of the molecular chain obtained, the conversion of 1,1,3,3,5,5-hexamethylcyclotrisiloxane was tracked by GLC. Also, the number average molecular weight and the polydispersity of the dimethylpolysiloxane having a silanol group at only one end of the molecular chain obtained were tracked by GPC. These results are shown in Table 5.

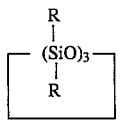

Comparison Example 3

Nonequilibrium polymerization reaction was carried out in the same way as Example 3 except that ethyl acetate was not used. After various times (3 hours, 4.17 hours, 22 hours), the reaction mixture was sampled, and in the same way as Example 3, dimethylpolysiloxane having a silanol group at only one end of the molecular chain was obtained. From the dimethylpolysiloxane having a silanol group at only one end of the molecular chain obtained, the conversion of 1,1,3,3,5,5-hexamethylcyclotrisiloxane was tracked by GLC. Also, the number average molecular weight and the polydispersity of the dimethylpolysiloxane having a silanol group at only one end of the molecular chain obtained were tracked by GPC. These results are shown in Table 6.

TABLE 6

| Reaction time (hrs) | 3 | 4.17 | 22 |
|---|---|---|---|
| Conversion of 1,1,3,3,5,5-hexamethylcyclotrisiloxane (%) | 81.2 | 91.1 | 100 |
| Dimethylpolysiloxane having a silanol group at only one end of the molecular chain | | | |
| Number average molecular weight | 11668 | 12840 | 14308 |
| Polydispersity | 1.04 | 1.05 | 1.18 |

Application Example

The dimethylpolysiloxane having a methacryloxy group at only one end of the molecular chain obtained in Example 1, (7.2 grams), butyl acrylate (16.8 grams) and toluene (30 grams) were mixed under a nitrogen atmosphere. To this mixture, 6 grams of toluene solution, which contained azobisisobutyronitrile (0.06 gram), was added dropwise. After completion of this dropwise addition, the mixture was heated and stirred at 60° C. 29 hours, and a toluene solution of a poly(butyl acrylate) grafted polydimethylsiloxane was obtained. Using a Fourier transform infrared spectrophotometer as the detector and the characteristic absorption of $SiMe_2$ group at 800~810 $cm^{-1}$ as the detecting wavelength, GPC measurement (hereafter GPC FT-IR) of the toluene solution of poly(butyl acrylate) grafted polydimethylsiloxane, was carried out. It was found that 95.8% of the dimethylpolysiloxane having a methacryloxy group at only one end of the molecular chain used was copolymerized. By this result, it was found that the purity of dimethylpolysiloxane having a methacryloxy group at only one end of the molecular chain obtained in Example 1 was 95.8%. The viscosity of the toluene solution of poly(butyl acrylate) graft-bonded polydimethylsiloxane obtained was 944 centipoises.

For comparison, the dimethylpolysiloxane having a methacryloxy group at only one end of the molecular chain obtained in Comparison example 1 was copolymerized with butyl acrylate in the same manner as described above. By GPC FT-IR analysis of the toluene solution of poly(butyl acrylate) grafted polydimethylsiloxane, it was found that 91.4% of the dimethylpolysiloxane used was copolymerized. By this result, it was found that the purity of dimethylpolysiloxane having a methacryloxy group at only one end of the molecular chain obtained in Comparison example 1 was 91.4%. The viscosity of the toluene solution of poly(butyl acrylate) graft-bonded polydimethylsiloxane was 2,500 centipoises.

That which is claimed is:

1. A method for preparing a diorganopolysiloxane of the formula $R((_2SiO)_pB$ wherein R is an independently selected monovalent hydrocarbon group, B is selected from the group consisting of a hydrogen atom and an organosilyl group having the formula $-SiR_2R'$ in which R is as defined above, R' is selected from the group consisting of a hydrogen atom and an organo functional group and p is an integer having a value of at least 1, said method comprising:

(1) polymerizing, in a nonequilibrium polymerization reaction,
(A) a cyclic trisiloxane having the formula $$\overline{\phantom{-}(SiR_2O)_3\phantom{-}}$$

in which R is as defined above, optionally in the presence of
(B) a compound having its formula $R(R_2SiO_mH$ in which R is as defined above and m is an integer having a value of at least 1, using
(C) a lithium compound catalyst of the general formula $R(R_2SiO)_nLi$ in which R is as defined above and n is an integer having a value of at least 0, said nonequilibrium polymerization reaction taking place in the presence of
(D) a compound selected from the group consisting of a nitrile compound and an ester compound and
(E) a polar solvent which does not contain activated hydrogen; and
(II) terminating the nonequilibrium polymerization reaction product obtained from step (I) using
(F) a compound selected from the group consisting of an acid and an organohalogenosilane of the formula $R'R_2SiX$ in which R and R' are as defined above and X is a halogen atom.

2. The method according to claim 1, wherein said cyclic trisiloxane (A) is selected from the group consisting of 1,1,3,3,5,5-hexamethylcyclotrisiloxane, 1,1,3,3,5,5-hexaphenylcyclotrisiloxane, 1,1,3,3,5,5-hexavinylcyclotrisiloxane, 1,3,5-trimethyl-1,3,5-trivinylcyclotrisiloxane, 1,3,5-trimethyl-1,3,5-triphenylcyclotrisiloxane, 1,3,5-triethyl-1,3,5-trimethylcyclotrisiloxane, 1,3,5-trimethyl-1,3,5-tripropylcyclotrisiloxane and 1,3,5-trimethyl-1,3,5-triphenethylcyclosiloxane.

3. The method according to claim 2, wherein said compound (B) is selected from the group consisting of trimethylsilanol, dimethylvinylsilanol, dimethylphenylsilanol and triphenylsilanol.

4. The method according to claim 2, wherein said compound (B) is selected from the group consisting of dimethylsiloxane capped with hydroxydimethylsiloxy group at one end and with trimethylsiloxy group at the other end, methylphenylsiloxane capped with hydroxydimethylsiloxy group at one end and with trimethylsiloxy group at the other end, methylphenylsiloxane capped with hydroxydiphenylsiloxy group at one end and with trimethylsiloxy group at the other end, methylphenylsiloxane capped with hydroxydimethylsiloxy group at one end and with dimethylvinylsiloxy group at the other end, methylphenylsiloxane-methylvinylsiloxane copolymer capped with hydroxydimethylsiloxy group at one end and with trimethylsiloxy group at the other end and methylphenylsiloxane-diphenylsiloxane copolymer capped with hydroxydimethylsiloxy group at one end and with trimethylsiloxy group at the other end.

5. The method according to claim 2, wherein said compound (D) is selected from the group consisting of acetonitrile, propionitrile, succinonitrile, butyronitrile, isobutyronitrile, valeronitrile, and α-tolunitrile and mixtures thereof.

6. The method according to claim 2, wherein said compound (D) is selected from the group consisting of methyl acetate, ethyl acetate, propyl acetate, isopropyl acetate, butyl acetate, isobutyl acetate, sec-butyl acetate, pentyl acetate, isopentyl acetate, cyclohexyl acetate, benzyl acetate, methyl propionate, ethyl propionate, butyl propionate, isopentyl propionate and mixtures thereof.

7. The method according to claim 5, wherein said solvent (E) is selected from the group consisting of tetrahydrofuran, dimethylformamide and dimethyl sulfoxide.

8. The method according to claim 6, wherein said solvent (E) is selected from the group consisting of tetrahydrofuran, dimethylformamide and dimethyl sulfoxide.

9. The method according to claim 1, wherein said compound (D) is selected from the group consisting of acetonitrile, propionitrile, succinonitrile, butyronitrile, isobutyronitrile, valeronitrile, and a-tolunitrile and mixtures thereof.

10. The method according to claim 9, wherein said compound (D) is acetonitrile.

11. The method according to claim 1, wherein said polar solvent (E) is selected from the group consisting of tetrahydrofuran, 1,4-dioxane, ethyleneglycoldimethylether, diethyleneglycoldimethylether, dimethylformamide, dimethyl sulfoxide, hexamethylphosphoric triamide and mixtures thereof.

12. The method according to claim 1, wherein said polar solvent (E) is selected from the group consisting of tetrahydrofuran, dimethylformamide and dimethyl sulfoxide.

* * * * *